United States Patent [19]

Mueller

[11] 3,852,709
[45] Dec. 3, 1974

[54] METHOD & APPARATUS FOR SEISMIC HOLOGRAPHIC EXPLORATION

[75] Inventor: Rolf K. Mueller, Brighton, Mich.

[73] Assignee: The Bendix Corporation, Southfield, Mich.

[22] Filed: Aug. 25, 1972

[21] Appl. No.: 283,888

[52] U.S. Cl.... 340/15.5 DS, 340/15.5 CP, 340/5 H, 73/67.5 H
[51] Int. Cl. .......................... G01v 1/34, G01v 1/28
[58] Field of Search...... 340/15.5 CP, 15.5 DS, 5 H, 340/5 I; 73/67.5 H

[56] References Cited
UNITED STATES PATENTS
3,450,225  7/1969  Silverman .................. 340/15.5 VO
3,552,858  1/1971  Haines et al. ...................... 340/5 H OTHER PUBLICATIONS
Mueller et al., "Holographic Weak–Signal Enhancement Technique," 2/72, pg. 457–462, Journal Appl. Phys., Vol. 43, No. 2.

Primary Examiner—Maynard R. Wilbur
Assistant Examiner—N. Moskowitz
Attorney, Agent, or Firm—James R. Ignatowski

[57] ABSTRACT

Method and apparatus of seismic holographic exploration whereby acoustic energy is directed through the earth's surface to an underground object of which a hologram is to be made. This acoustic energy is transmitted at a first frequency and then the energy reflected both from the object and a mask between the object and the earth's surface is detected. Subsequently, acoustic energy at a second frequency is transmitted and that from the mask is detected. The detected energy is then processed so as to remove non-desired components and thereby isolate the desired components required to develop the hologram of the object.

18 Claims, 3 Drawing Figures

METHOD & APPARATUS FOR SEISMIC HOLOGRAPHIC EXPLORATION

This invention relates to a method and apparatus adapted, although not exclusively, for seismic exploration.

Holographic identification of an object disposed within a homogeneous medium such as water, is facilitated by the fact that the medium will not refract and reflect the elastic waves propagated toward the object to be identified. Consequently only waves which strike the object are reflected, and the reflected wave energy provides a signal representative of the object alone. This signal may be used directly to control the reconstruction apparatus and provide an image of the object.

In a heterogeneous medium, such as the earth, wave energy will be refracted and reflected not only by the object but also by the variations in the medium. Consequently, the reflected wave energy will provide a mixed multicomponent signal comprised of object representing and medium representing components. This signal at best would result in a distorted image of the object, and therefore, cannot be used directly in reconstruction.

With the foregoing in mind, method and apparatus are contemplated for developing acoustical holograms of objects situated below the earth's surface.

Also contemplated are method and apparatus for transmitting acoustic energy at two different frequencies, detecting the reflected energy and then processing the reflected energy so as to isolate the components of the reflected energy to be utilized in developing a hologram of the object.

Another object is to provide method and apparatus for irradiating an underground object with acoustic energy of a first frequency and detecting the energy reflected by the object and the mask, irradiating the mask with acoustic energy of a second frequency and detecting the energy reflected thereby, and then processing the reflected energy so as to remove the mask components from the energy reflected by the object and the mask, thereby providing an image component representing the object.

The foregoing and other objects and advantages of the invention will become apparent from the following description of the accompanying drawings in which.

Figure 1:
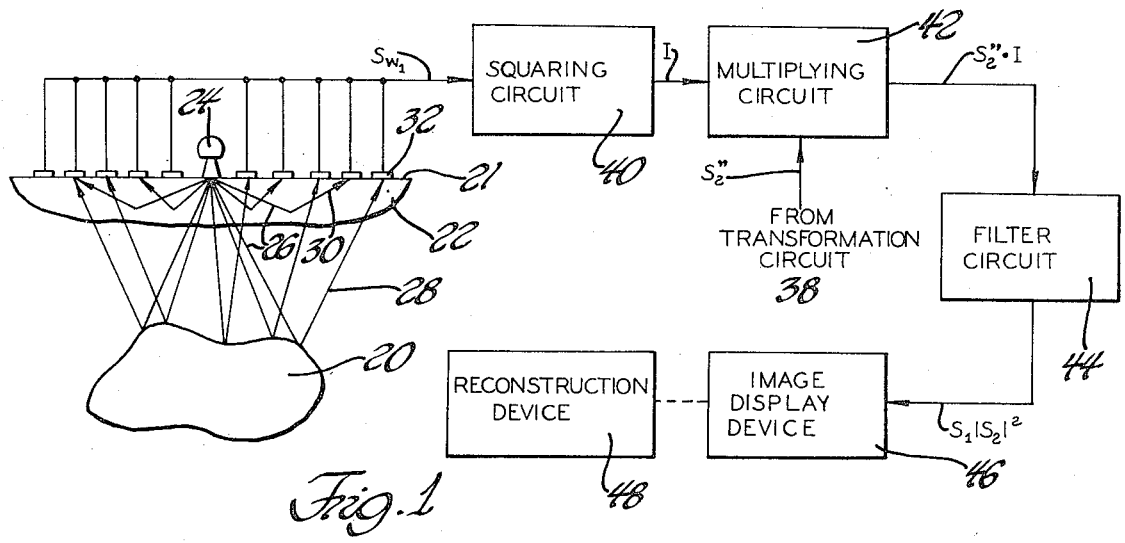
FIG. 1 is a schematic diagram of apparatus incorporating the principles of the invention shown performing a step of the method.

Referring to FIG. 1, an object 20, such as a geologic formation to be identified, is shown subterraneously disposed below the earth's surface 21. Since the earth is a heterogeneous medium having lithologic variations usually comprising different types of rock and soil layers, these will refract and reflect energy waves propagated through it and the wave energy reflected by the object 20 will be mixed with the wave energy reflected by the lithologic variations. Therefore direct use of the object reflected waves in image reconstruction is impossible. To simplify this analysis, a single lithologic variation in the form of a stratum of soil or a mask 22 is shown to be disposed between the object 20 and the earth's surface 21. It should be understood that for a multiplicity of lithologic variations the process herein described will not vary, but will be performed a multiplicity of times as will become apparent.

A wave energy source in the form of a sonic transmitter the numeral 24 is situated on the earth's surface approximately vertically above the object 20. This sonic transmitter 24 will, for the application to seismic exploration, preferably have an adjustable output frequency and operate in the audio frequency range because this range is especially suited to provide a desirable range of penetration depths of wave energy into the earth.

A first wave of coherent acoustic energy 26 is directed from the sonic transmitter 24 toward object 20 at a predetermined frequency $\omega_1$. The frequency $\omega_1$ is selected to permit penetration of the wave to the object 20. It should be kept in mind that the higher the frequency the lower the penetration capability will be. This first energy wave 26 will strike both the object 20 and the mask 22, which will reflect toward the earth's surface an object reflected wave 28 and a mask reflected wave 30. Both the object reflected wave 28 and the mask reflected wave 30 are received by an array of seismic detectors or microphones 32 strategically disposed along the earth's surface.

The microphone array 32 in a well known way converts the reflected waves 28 and 30 into electrical impulses, the impulses providing a mixed multicomponent signal which may be expressed mathematically as:

$$S\omega_1 = S_1 + S_2 \qquad (1)$$

where:

$S\omega_1$ = the multicomponent signal of the wave field reat frequency $\omega_1$;

$S_1$ = the signal component of the wave field reflected from object 20 at frequency $\omega_1$; and $S_2$ = the signal component of the wave field reflected from mask 22 at frequency $\omega_1$.

Since the mixed multicomponent signal $S\omega_1$ cannot be used directly to reconstruct the image of object 20 due to the presence of the mask reflected component $S_2$, and since the object reflected component $S_1$ cannot be directly obtained, the $S_2$ component must be determined to provide the necessary information for reconstruction of the object image.

Figure 2:
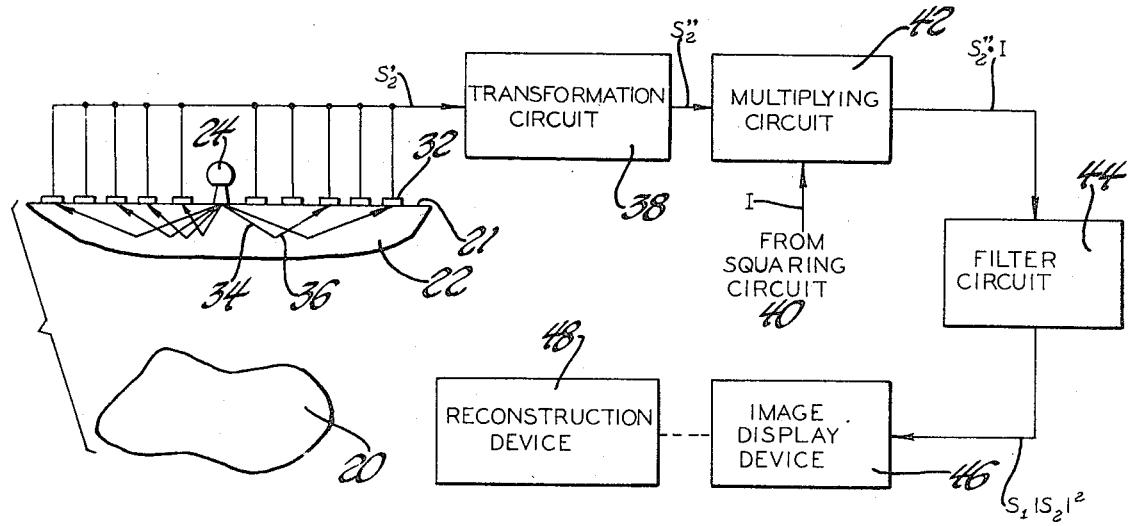
FIG. 2 is a schematic diagram of a part of the apparatus shown performing another step of the method.

To accomplish this, as shown in FIG. 2, a second wave of coherent acoustic energy 34 is directed from the sonic transmitter 24 toward object 20. This second wave 34 is generated at a second predetermined frequency $\omega_2$, selected to permit penetration of the wave 34 to mask 22 and determined as hereinbefore explained. Since the wave 34 penetrates only to the mask 22, the reflected wave 36 directed to the earth's surface is representative solely of the mask 22. This mask reflected wave 36 is received by the microphone array 32, which may but need not necessarily be changed to accomodate frequency $\omega_2$, and is converted into electrical impulses which provide a signal which will be expressed mathematically as:

$$S\omega_2 = S_2' \qquad (2)$$

where:

$S\omega_2$ = the signal of the wave field received at frequency $\omega_2$; and $S_2'$ = the signal of the wave field reflected from mask 22 at frequency $\omega_2$.

Since the signal component $S_2$ of the mixed multicomponent signal $S\omega_1$ and the signal $S_2'$ both represent wave fields reflected solely from the mask 22, but at different frequencies, then transformation of signal $S_2'$ from frequency $\omega_2$ to frequency $\omega_1$ will provide a synthetic approximation to signal component $S_2$ usable in the reconstruction of an image of object 20. This transformation and approximation may be expressed mathematically as:

$$S_2' \longrightarrow S_2'' \sim S_2 \tag{3}$$

where:

$S_2''$ = the synthetic signal of the wave field that would be reflected from mask 22 at frequency $\omega_1$.

Such transformation may be performed by a transformational integrating circuit 38 which would determine the object that would generate the signal $S_2'$ at frequency $\omega_2$ and then determine the signal $S_2''$ which the same object would generate at frequency $\omega_1$. Such an integrating circuit may, for example, be represented by the mathematical equivalent:

$$S_2'(Y) = \int A(x,R;y,\lambda) O_2(x,R) \, dx dR \tag{4}$$

$$O_2(x,R) = \int A^{-1}(x,R;y,\lambda) S_2'(y) \, dy \tag{5}$$

$$S_2''(y) = \int A^{-1}(x,R;y',\lambda) A(x,R;y,\lambda') S_2'(y') \, dx dy' dR \tag{6}$$

where:

$O_2$ = represents the object distribution.

$A$ = kernel of the transformation.

$x$ = rectanguler coordinate for the object distribution.

$R$ = the penetration depth to the mask 22.

$y$ = rectangular coordinates for the signal distribution.

$y'$ = rectangular coordinates for the signal distribution.

$\lambda$ = the wave length of the wave generated at frequency $\omega_2$; and $\lambda'$ = the wave length of the wave generated at frequency $\omega_1$.

The mixed multicomponent signal $S\omega_1$ and the synthetic signal $S_2''$ now may be used to clearly reconstruct the image of the object 20 by the electronic and mathematical process hereinafter to be described.

The intensity distribution I of the signal $S\omega_1$ is formed by squaring the absolute value of this signal $S\omega_1$. This is represented mathematically by the equation:

$$I = S\omega_1{}^2 = |S_1+S_2|^2 = |S_1|^2 + |S_2|^2 + S_1{}^*S_2 + S_1 S_2{}^* \tag{7}$$

where:

$S_1{}^*$ = the complex conjugate of $S_1$; and $S_2{}^*$ = the complex conjugate of $S_2$. This formation of the intensity distribution I from the mixed multicomponent signal $S\omega_1$ is accomplished by a squaring circuit 40. It should be noted that the $S_1 S_2{}^*$ term of the intensity distribution I comprises the product of the desired object representing component $S_1$ of the signal $S\omega_1$ and the complex conjugate of the mask component $S_2{}^*$. Since the component $S_2$ is, by definition, approximated by the synthetic signal $S_2''$, the multiplication of the intensity distribution I and the synthetic signal $S_2''$ will therefore provide a component $S_1|S_2|^2$. This multiplication is mathematically expressed by the equation:

$$S_2'' \cdot I \sim S_2 \cdot I = S_2|S_1|^2 + S_2|S_2|^2 + S_1{}^*S_2{}^2 + S_1|S_2|^2 \tag{8}$$

where $S_2|S_1|^2$, $S_2|S_2|^2$ and $S_1{}^*S_2{}^2$ = non-desired signal components; and $S_1|S_2|^2$ = the signal component providing a clear image of the object 20.

That is, the $S_1|S_2|^2$ component of the multiplication product consists of the object representing component $S_1$ enhanced by a factor $|S_2|^2$. This multiplication is performed by feeding both the intensity distribution I and the mask signal $S_2''$ to any suitable multiplying circuit 42. The output of the multiplying circuit 42 is the product defined by equation (8) above, from which the non-desired components must be removed.

Removal of the non-desired components $S_2|S_1|^2$, $S_2|S_2|^2$ and $S_1{}^*S_2{}^2$ can be accomplished in various ways; e.g., by filtering. For this purpose an appropriate filter circuit 44 is utilized comprising a multiplier or a series of multipliers which multiply the $S_2''$ product by appropriate transformation factors, such as Fourier or Fresnel transforms, selected to remove the non-desired components.

The remaining and desired signal component $S_1|S_2|^2$ is then fed to an image display device 46 such as a cathode ray tube, so as to develop a hologram of the object 20. Reconstruction of the hologram is done in the usual way with a reconstruction device 48, which includes a conventional laser and suitable optics to obtain the reconstructed image of the object 20.

Summarizing the method of the preferred embodiment, an object 20 concealed in a heterogeneous medium such as the earth is identified by application of the principle that wave energy penetration depth is a function of generation frequency and medium density. Bearing this relationship in mind, the object 20 is irradiated with wave energy 26 at a predetermined frequency $\omega_1$ and the reflected wave energy detected and converted to an electrical signal $S_1+S_2$. The mask 22 is then irradiated with wave energy 34 at a predetermined frequency $\omega_2$ and the reflected wave energy detected and converted to an electrical signal $S_2'$. The latter signal $S_2'$ is then transformed and processed with the former signal $S_1+S_2$ to provide an output representative of the object representing signal component $S_1$. This output is then utilized to provide an image of the object 20.

Figure 3:
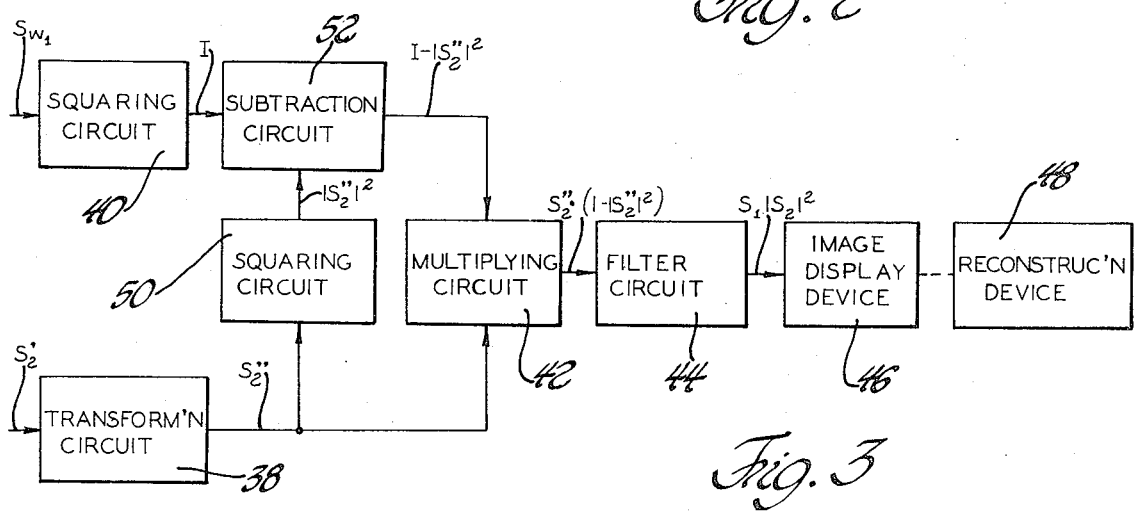
FIG. 3 is a schematic diagram of a modification of the FIG. 1 circuitry.

Referring now to FIG. 3, a modification of the circuitry of FIG. 1 is shown which simplifies the non-desired component removal process of filter circuit 44. After transformation by the circuit 38 of the signal $S_2'$ reflected from mask 22 at frequency $\omega_2$ to signal $S_2''$ of frequency $\omega_1$, signal $S_2''$ is fed to both the multiplying circuit 42 and a squaring circuit 50 where the square of the absolute value of signal $S_2''$ is formed, represented mathematically as $|S_2''|^2$. The output $|S_2''|^2$ of squaring circuit 50 and the intensity distribution I are both then fed to a subtraction circuit 52 such as a difference amplifier which, in view of equation (3), performs the mathematical process expressed by the equation:

$$I - |S_2''|^2 \sim |S_1|^2 + S_1^* S_2 + S_1 S_2^* \tag{9}$$

The output of subtraction circuit 52 is then fed to the multiplying circuit 42 for multiplication with the signal $S_2''$, which then provides an input to the filter circuit 44 from which the nondesired component $S_2|S_2|^2$ has already been removed.

As was hereinbefore mentioned, a multiplicity of subterranean masks may lie between the earth's surface and the object to be identified. Under these circumstances the method and apparatus used to identify the object are the same as were used to identify the object 20 concealed by a single mask 22, except that the procedure must be repeated for each additional mask. If, for example, three lithologic variations fall between the energy source 24 and the object 20, the reflected wave energy will provide a signal $S_1+S_2+S_3+S_4$, a mixed multicomponent signal having components representing each of the masks and the object representing component $S_1$. In such a case, each of the mask components can be determined by the irradiation, detection and transformation processes hereinbefore described, and then removed from the mixed multicomponent signal. In other words, each successive mask is treated as an object and identified in accordance with the preferred embodiment, the process being repeated until the desired object is identified.

What is claimed is:

1. A method of developing a hologram of a subterraneously disposed object displaced beneath a mask comprising the steps of:
    irradiating the object and the mask with coherent acoustic energy of a first predetermined frequency selected to permit penetration of the coherent acoustic energy through the mask and to the object;
    detecting the energy reflected from both the object and the mask at the first predetermined frequency;
    irradiating the mask with coherent acoustic energy of a second predetermined frequency selected to permit penetration of the coherent acoustic energy to the mask only;
    processing the reflected energy so as to remove the mask component from the energy reflected both from the object and the mask and thereby develop an output having an enhanced image component representing the object only; and
    displaying the enhanced image component to develop a hologram of the object.

2. The method of claim 1, wherein the step of processing the reflected energy comprises the steps of:
    forming the intensity distribution of the energy reflected at the first predetermined frequency;
    synthesizing a signal of the first predetermined frequency corresponding to the energy reflected at the second predetermined frequency; and
    multiplying the synthesized signal of the first predetermined frequency and the intensity distribution to provide a multicomponent output signal having an enhanced image component representing the object.

3. The method of claim 2 further comprising the step of removing the components other than the enhanced image component representing the object from the output.

4. The method of claim 2 wherein the step of forming the intensity distribution comprises the steps of:
    converting the energy reflected at the first predetermined frequency into electrical impulses; and
    squaring the absolute value of the electrical impulses.

5. The method of claim 2 wherein the step of synthesizing a signal of the first predetermined frequency comprises the steps of:
    converting the energy reflected at the second predetermined frequency into electrical impulses; and
    transforming the electrical impulses obtained from the energy reflected at the predetermined frequency to a signal of the first predetermined frequency.

6. A method of developing a hologram of a subterraneously disposed object displaced beneath a mask comprising the steps of:
    irradiating the object and the mask with coherent acoustic energy of a first predetermined frequency selected to permit penetration of the coherent acoustic energy through the mask and to the object;
    detecting the energy reflected from both the object and the mask at the first predetermined frequency;
    converting the energy reflected at the first predetermined frequency into a first electrical signal;
    forming the square of the absolute value of the first electrical signal;
    irradiating the mask with coherent acoustic energy of a second predetermined frequency selected to permit penetration of the coherent acoustic energy to the mask only;
    converting the energy reflected at the second predetermined frequency into a second electrical signal;
    transforming the second electrical signal to a synthetic signal of the first predetermined frequency;
    processing the synthetic signal and and the square of the absolute value of the first electrical signal including the step of multiplying the synthetic signal and the square of the absolute value of the first electrical signal so as to develop an output having an enhanced image component representing the object; and
    displaying the enhanced image component to develop a hologram of the object.

7. The method of claim 6 wherein the processing step further comprises the step of multiplying the output by an appropriate transformation factor to remove components other than the enhanced image component representing the object from the output.

8. The method of claim 6 wherein the first electrical signal is efined by the equation:

$$S = S_1 + S_2$$

where:
    $S_1$ = the object component; and $S_2$ = the mask component; and wherein the step of forming the square of the absolute value of the first electrical signal is represented mathematically by the equation:

$$|S_1+S_1|^2 = |S_1|^2 + |S_2|^2 + S_1{}^*S_2 + S_1S_2{}^*$$

where:

$S_1{}^*$ and $S_2{}^*$ = the complex conjugates of $S_1$ and $S_2$ respectively.

9. The method of claim 8, wherein the transformation step is represented mathematically by the equation:

$$S_2' \longrightarrow S_2'' \sim S_2$$

where:

$S_2'$ = the second electrical signal of the second predetermined frequency; and $S_2''$ = the synthetic electrical signal of the first predetermined frequency.

10. The method of claim 9 wherein the multiplication step is represented mathematically by the equation:

$$S_2'' \cdot |S_1+S_2|^2 \sim S_2 \cdot |S_1+S_2|^2 = S_2|^2 = S_2|S_1|^2 + S_2|S_2|^2 + S_1{}^*S_2{}^2 + S_1|S_2{}^2|$$

where:

$S_2|S_1|^2$, $S_2|S_2|^2$ and $S_1{}^*S_2{}^2$ = enhanced components other than the component representing an image of the object; and $S_1|S_2|^2$ = the enhanced image component representing the object.

11. The method of claim 10 further including the step of multiplying the output of the multiplication step by an appropriate transformation factor to remove the components represented mathematically as $S_2|S_1|^2$, $S_2|S_2|^2$ and $S_1{}^*S_2{}^2$.

12. A method of developing a hologram of a subterraneously disposed object displaced beneath a mask comprising the step of:

irradiating the object and the mask with coherent acoustic energy of a first predetermined frequency selected to permit penetration of the coherent acoustic energy through the mask and to the object;

detecting the energy reflected from both the object and the mask at the first predetermined frequency;

converting the energy reflected at the first predetermined frequency into a first electrical signal;

forming the square of the absolute value of the first electrical signal;

irradiating the mask with coherent acoustic energy of a second predetermined frequency selected to permit penetration of the coherent acoustic energy to the mask only;

converting the energy reflected at the second predetermined frequency into a second electrical signal;

transforming the second electrical signal to a synthetic signal of the first predetermined frequency;

multiplying the synthetic signal and the square of the absolute value of the first electrical signal to develop an output having an enhanced image component representing the object;

forming the square of the synthetic signal;

subtracting the square of the synthetic signal from the square of the absolute value of the first electrical signal;

multiplying the difference and the synthetic signal to develop an output having an enhanced image component representing the object; and displaying the enhanced image component to develop a hologram of the object.

13. The method of claim 12, wherein the step of forming the square of the absolute value of the first electrical signal is represented mathematically by the equation:

$$|S_1+S_2|^2 = |S_1|^2 + |S_2|^2 + S_1{}^*S_2 + S_1S_2{}^*$$

where:

$S_1$ = the object component;

$S_2$ = the mask component; and $S_1{}^*$ and $S_2{}^*$ = the complex conjugates of $S_1$ and $S_2$ respectively; and wherein the transformation step is represented mathematically by the equation:

$$S_2' \longrightarrow S_2'' \sim S_2$$

where:

$S_2'$ = the second electrical signal of the second predetermined frequency; and $S_2''$ = the synthetic electrical signal of the first predetermined frequency; and wherein the subtraction step is represented mathematically by the equation:

$$|S_1|^2 + |S_2|^2 + S_1{}^*S_2 + S_1S_2{}^* - |S_2|^2 = |S_1|^2 + S_1{}^*S_2 + S_1S_2{}^*$$

and wherein the multiplication step is represented mathematically by the equation:

$$S_2 \cdot (|S_1|^2 + S_1{}^*S_2 + S_1S_2{}^*) = S_2|S_1|^2 + S_1{}^*S_2{}^2 + S_1|S_2|^2$$

where:

$S_2|S_1|^2$ and $S_1{}^*S_2{}^2$ = components other than the component representing an enhanced image of the object; and $S_1|S_2|^2$ = the enhanced image component representing the object.

14. The method of claim 13 further comprising the step of multiplying the output of the multiplication step by an appropriate transformation factor to remove the components represented mathematically as $S_2|S_1|^2$ and $S_1{}^*S_2{}^2$.

15. Apparatus for developing a hologram of a subterraneously disposed object displaced beneath a mask comprising:

means for irradiating the object and the mask with coherent acoustic energy at a first predetermined frequency selected to permit penetration of the coherent acoustic energy through the mask and to the object and for irradiating the mask with coherent acoustic energy at a second predetermined frequency selected to permit penetration of the coherent acoustic energy to the mask only;

means for detecting the energy reflected by both the mask and the object and also from the mask only;

means for processing the reflected energy so as to remove the mask component from the energy irradiating the mask and the object and thereby develop an output having an enhanced image component representing the object; and means for displaying the enhanced image component to develop a hologram of the object.

16. Apparatus according to claim 15, the detecting menas further includes means for converting the energy reflected from both the object and the mask at the first predetermined frequency into a mixed multicomponent electrical signal and for converting the energy reflected from the mask at the second predetermined frequency into an electrical signal.

17. Apparatus according to claim 16, wherein the processing means comprises:
means for forming the square of the absolute value of the mixed multicomponent electrical signal;
means for transforming the electrical signal of the second predetermined frequency into an electrical signal of the first predetermined frequency;
means for multiplying the electrical signal of the first predetermined frequency and the square of the absolute value of the mixed multicomponent electrical signal to provide a multicomponent output signal having an enhanced image component representing the object.

18. Apparatus according to claim 17 wherein said multicomponent output signal is represented mathematically by the equation:

$$S_2'' \cdot |S_1+S_2|^2 \sim S_2 \cdot |S_1+S_2|^2 = S_2|S_1|^2 + S_2|S_2|^2 + S_1^* S_2^2 + S_1|S_2|^2$$

where:
$S_1$ = the object component of the mixed multicomponent wave energy signal;
$S_2$ = the mask component of the mixed multicomponent wave energy signal;
$S_2''$ = the mask wave energy signal of object-depth frequency;
$S_1^*$ and $S_2^*$ = the complex conjugates of $S_1$ and $S_2$ respectively; and
$S_1|S_2|^2$ = the enhanced image component representing the object.

* * * * *

UNITED STATES PATENT OFFICE
CERTIFICATE OF CORRECTION

PATENT NO. : 3,852,709
DATED : December 3, 1974
INVENTOR(S) : Rolf K. Mueller

It is certified that error appears in the above-identified patent and that said Letters Patent are hereby corrected as shown below:

Column 4, Line 12 delete the equation " $S_2" \cdot I \sim S_2 \cdot I = S_2|S_1|^2 + S_2|^2 + S_1 * S_2^2 + S_1|S_2|^2$ "

and insert the equation --- $S_2" \cdot I \sim S_2 \cdot I = S_2|S_1|^2 + S_2|S_2|^2 + S_1 * S_2^2 + S_1|S_2|^2$ ---

Column 6, Line 63, change "efined" to --- defined ---

Column 7, Line 23 and 24, delete the equation " $S_2" \cdot |S_1+S_2|^2 \sim S_2 \cdot |S_1+S_2|^2 = S_2|^2 = S_2|S_1|^2 + S_2|S_2|^2 + S_1 * S_2^2 + S_1|S_2^2|$ " and insert the equation --- $S_2" \cdot |S_1+S_2|^2 \sim S_2 \cdot |S_1+S_2|^2 = S_2|S_1|^2 + S_2|S_2|^2 + S_1 * S_2^2 + S_1|S_2|^2$ ---

Signed and Sealed this second Day of September 1975

[SEAL]

Attest:

RUTH C. MASON
Attesting Officer

C. MARSHALL DANN
Commissioner of Patents and Trademarks